United States Patent [19]
Matthews

[11] Patent Number: 4,494,477
[45] Date of Patent: Jan. 22, 1985

[54] BOAT HULL

[76] Inventor: Leslie N. Matthews, 9 Boscombe Ave., City Beach, Western Australia, Australia

[21] Appl. No.: 400,419

[22] Filed: Jul. 21, 1982

Related U.S. Application Data

[63] Continuation of Ser. No. 121,071, Feb. 15, 1980, Pat. No. 4,351,262.

[51] Int. Cl.³ .............................................. B63B 1/22
[52] U.S. Cl. ...................................... 114/287; 114/61
[58] Field of Search ................... 114/39, 56, 61, 271, 114/283, 284, 285, 287, 288, 292, 270

[56] References Cited

U.S. PATENT DOCUMENTS

| | | | |
|---|---|---|---|
| 3,428,012 | 2/1969 | Sundberg | 114/287 |
| 3,437,067 | 4/1969 | Malin | 114/61 |
| 3,559,222 | 2/1971 | Walker | 114/287 |

Primary Examiner—Trygve M. Blix
Assistant Examiner—Jesûs D. Sotelo
Attorney, Agent, or Firm—Holman & Stern

[57] ABSTRACT

A boat hull having water engaging parallel hull portion separated by a bridge portion and an intermediate water-engaging hull portion disposed between adjacent parallel hull positions and underneath each bridge portion. An expandable and compressible plenum is disposed between each intermediate hull portion and bridge portion so that each intermediate hull portion will be lowered and raised respectively as the plenum is expanded and contracted.

12 Claims, 9 Drawing Figures

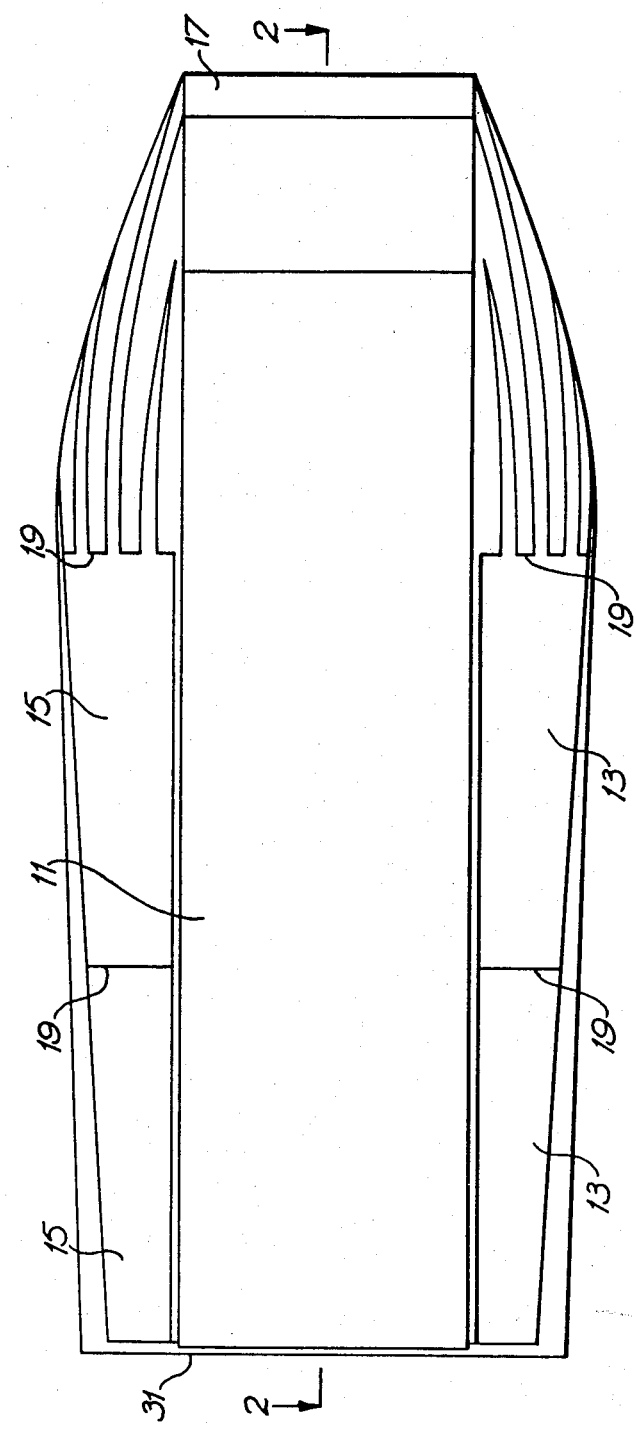

U.S. Patent  Jan. 22, 1985  Sheet 3 of 4  4,494,477
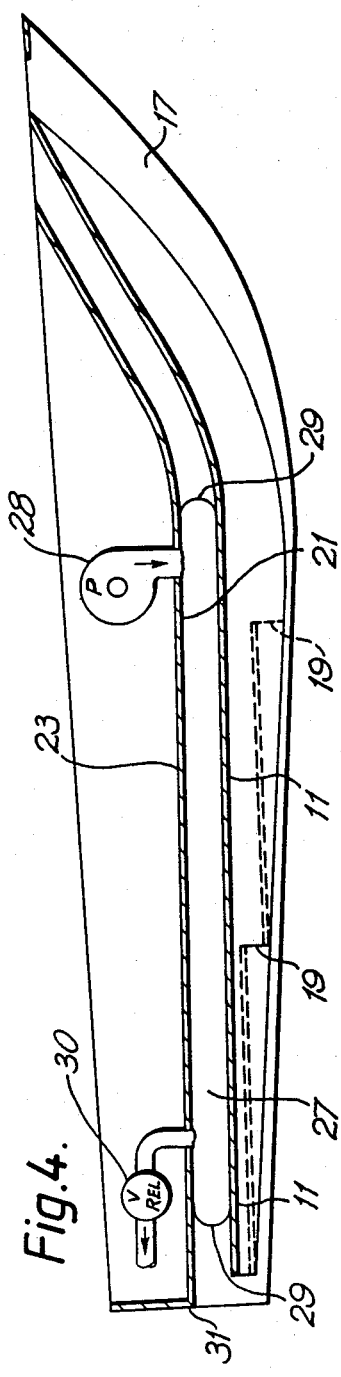
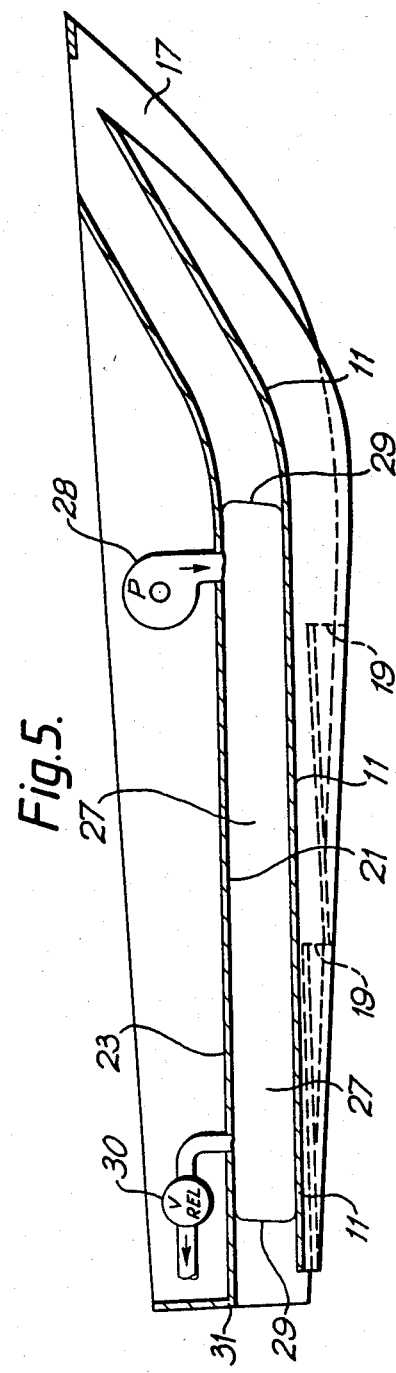

BOAT HULL

This application is a continuation of parent application Ser. No. 121,071, filed Feb. 15, 1980, now U.S. Pat. No. 4,351,262.

FIELD OF THE INVENTION

The present invention relates to an improved boat hull and to a boat incorporating such a hull.

DESCRIPTION OF THE PRIOR ART

Conventionally boats such as sailing boats and motor boats have a single rigid hull and are referred to as "monohull" vessels. The hulls of such vessels may either have a deeply "V" shaped cross-sectional shape which cuts deeply into the water and provides a relatively smooth ride through the water at the cost of high fuel consumption or they may have a flatter hull configuration which will allow the vessel to plane thereby reducing fuel consumption while providing a much more bumpy ride. Boats have also been constructed with two or three hulls and are known as "multihull" vessels. Multihull vessels have the advantage that they have more lateral stability than monohull vessels and that their wetted area is lower than that of a monohull vessel of similar size. They suffer, however, from the disadvantage that they have greater draft than a similarly sized monohull and that they have a tendency for the bow of the boat to dig into the water under the influence of a following swell or when running.

BRIEF SUMMARY OF THE INVENTION

The present invention is directed to a boat hull which includes a longitudinally extending intermediate hull portion movable relative to the remainder of the hull and an expandable plenum chamber positioned between the intermediate hull portion and the remainder of the hull. This construction allows many of the disadvantages of conventional monohull and multihull vessels to be overcome. Preferred embodiments of the invention enjoy the low fuel consumption of multihull and planing monohull configurations without either the bumpy ride of planing monohull vessels or the tendency of multihull vessels to nose dive in following seas. These preferred embodiments of the present invention also have the advantage of being able to vary the hull shape to provide a relatively shallow draft. This variation in hull shape can also be utilized to enable the boat to move over land under its own power with a "walking" motion.

The present invention consists in a boat hull comprising a pair of substantially parallel hull sections extending longitudinally from the bow to the stern of the hull and connected together in spaced apart relationship by a bridge portion, an intermediate hull section extending rearwardly from the region of the bow of the hull at least part way towards the stern of the hull and extending across a substantial part of the distance between the parallel hull sections, an expandable gas containing plenum chamber disposed between the intermediate hull section and the bridge portion, and means provided to expand and contract the plenum chamber such that the intermediate hull section will be raised and lowered, respectively, by the expansion and contraction of the plenum chamber.

The plenum chamber preferably comprises a bag of an elastic material disposed between the intermediate hull section and the bridge portion. Other forms of expandable plenum chamber can, however, be used. The compressibility of the gas within the plenum chamber enables the plenum chamber to act as a shock absorber when the underside of the intermediate hull section engages with the surface of the water. In use the intermediate hull section will be lowered when the boat starts to give the boat maximum planing ability. Once the boat has started to plane the intermediate hull section can be raised thereby reducing the wetted area of the boat. Even in this latter configuration the plenum chamber can be called upon to act as a shock absorber when the boat is driven sufficiently deeply into or through a wave.

The means to expand the plenum chamber preferably comprises an air blower adapted to blow air at low pressure into the plenum chamber. The plenum chamber is allowed to contract by the release of air through a suitable outlet port.

The intermediate hull section is preferably connected to the bridge portion by a parallel motion linkage such that the intermediate hull section can be moved forwardly and rearwardly of the remainder of the hull as well as being raised and lowered. In order to increase the flexibility of this movement each of the arms of the parallel motion linkage includes a double acting hydropneumatic ram or other means to vary the length of the arm. This latter arrangement allows the angle of attachment of the intermediate hull section to the sea to be varied. This feature can be of use not only in improving the performance of the boat but it can also be used to maintain the boat as a whole in a stable orientation to the horizontal despite the fact that the boat is travelling through a swell. In smaller boats these advantages may also be obtained by including a plurality of plenum chambers between the intermediate hull section and the bridge portion, the plenum chambers being disposed one behind the other along the length of the intermediate hull sections and varying the degree of expansion of the various plenum chambers. In this way as a boat runs down a swell the front plenum chamber can be expanded while the rear chamber is contracted which will have the effect of lifting the bow of the boat relative to the water orientation at that moment. As the boat travels up a swell the opposite procedure would be adapted to maintain the attitude of the boat relatively constant.

The intermediate hull section may have any desired external configuration, however, it is preferred that the cross sectional external configuration at least adjacent the bow of the hull be essentially "V" shaped. In longitudinal section it is preferred that the intermediate hull section is stepped with at least one rearwardly facing step along its length. If desired a longitudinally extending tunnel opening at its forward end above the bow end of the intermediate hull section and at its rear end into the rearwardly facing step may be provided on the intermediate hull section. The presence of such a tunnel is believed to facilitate the entrainment of air under the intermediate hull section and/or the bridge portion rearwardly of the aft end of the intermediate hull section which entrained air serves to reduce the wetted area of the hull and to provide aerodynamic lift to it.

In another aspect the present invention consists in a hull comprising a pair of substantially parallel hull sections extending longitudinally from the bow to the stern of the hull and connected together by a bridge portion, an intermediate hull section being provided beneath the bridge portion between the parallel hull sections and extending over at least part of the length of the hull, the intermediate hull section being connected to the bridge portion by a parallel motion linkage in which the length of each arm in the linkage may be varied such that when the arms are in an elongated condition the intermediate hull section will extend below the keel line of the parallel hull sections when the arms are in a vertical position and that when the arms are in a retracted condition the intermediate hull section will be raised above the keel line of the parallel hull sections, and means to cause relative longitudinal movement between the parallel hull sections and the intermediate hull section as the length of the arms in the linkage are varied.

BRIEF DESCRIPTION OF THE DRAWINGS

Hereinafter given by way of examply only is a preferred embodiment of this invention described with reference to the accompanying drawings in which:

FIG. 3 is a bottom plan view of the craft;

FIG. 4 is a sectional side elevation with the adjustable hull in the raised position;

FIG. 5 is a sectional side elevation with the adjustable hull in the lowered position;

DETAILED DESCRIPTION

Figure 1:
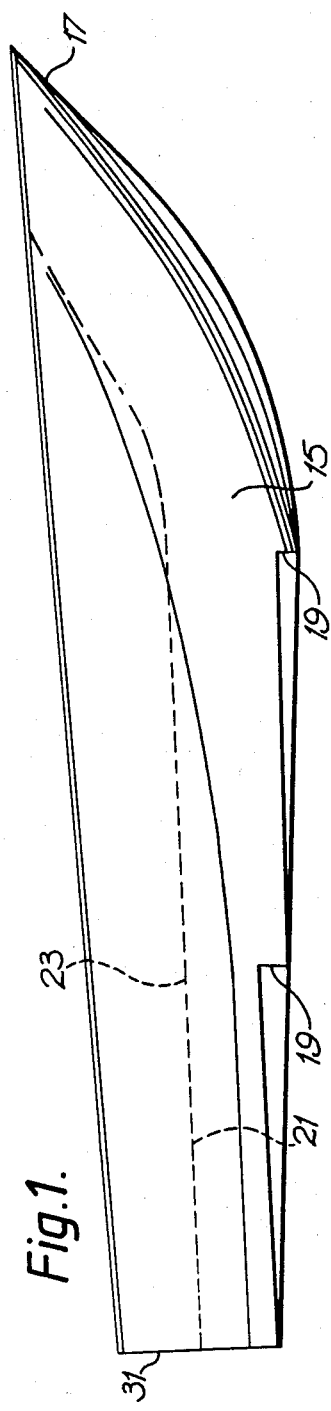
FIG. 1 is a side elevational view of a hull according to this invention.

In the embodiment shown in the drawings an improved boat hull is constructed by providing an adjustable hull section 11 adjacent and between the port 13 and starboard 15 hull sections. The bow 17 of the craft is formed with suitable inlets 18 to enable an intake of air to be ducted through tube 20 and vented from one or more transverse steps 19 beneath the hull. This exhausting of air provides an aerodynamic lift to the craft and reduces frictional resistance. The adjustable hull section 11 may be pivotally mounted between the port 13 and starboard 15 hull sections said pivot being transverse to the longitudinal axis of the craft and located near the bow 17. Alternatively the adjustable hull-section 11 may be mounted to the underside 21 of the fixed upper central deck area or bridge 23 by extension arms 25, as shown in FIGS. 6-9 of the drawings. The adjustable hull 11 is mounted so as to be able to move towards or away from the fixed upper central deck 23 and so form a chamber 27 between the underside 21 of the deck 23 and the inner side walls of the port and starboard hulls and the adjustable hull 11. Sealing members 29 are provided fore and aft and where ever necessary to complete the sealing of the expandable plenum chamber 27. Means are provided on the craft to control the size of the chamber 27 and the location of the adjustable hull 11.

Figure 2:
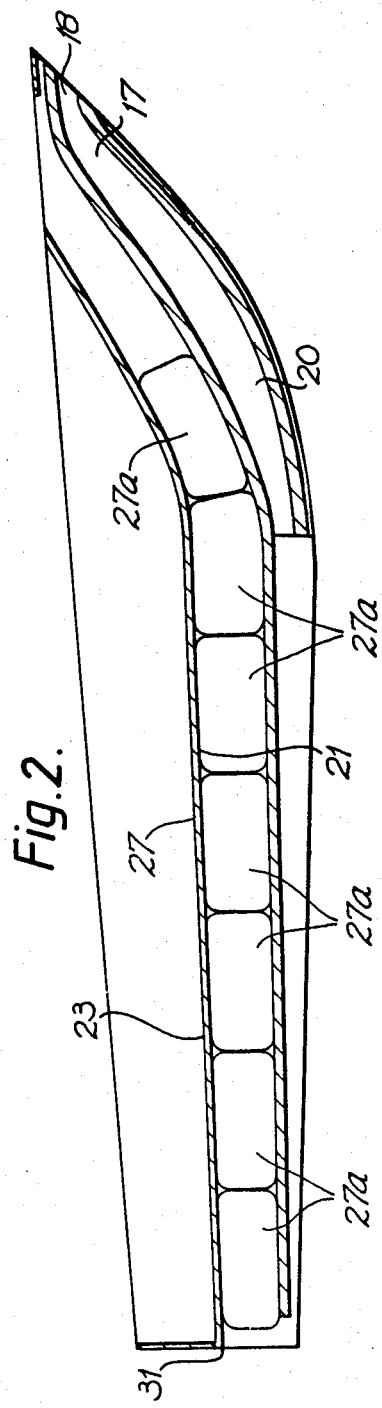
FIG. 2 is a sectional side elevation of the hull of FIG. 1, taken on line 2—2 of FIG. 3.

Preferably the chamber 27 is lined with an elastic membrane. If desired, the chamber 27 may be segmented into sub-units 27a as shown in FIG. 2.

Figure 6:
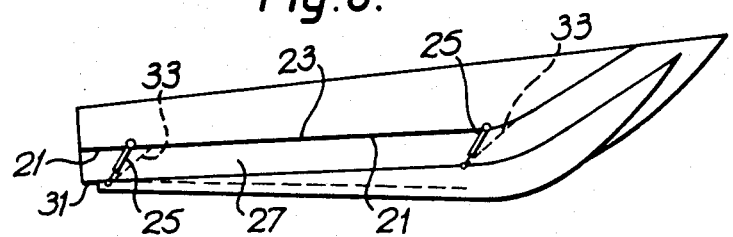
FIG. 6 is a schematic view of the extension or lifting mechanism in a partially elevated position.
Figure 7:
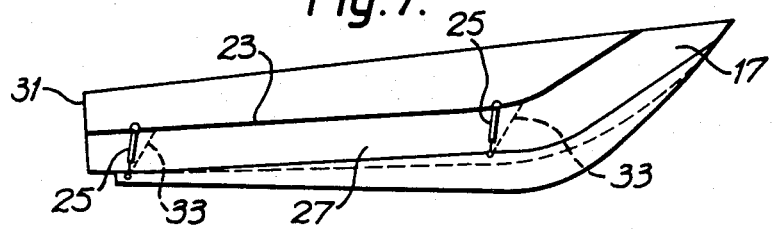
FIG. 7 is a schematic view similar to FIG. 6 showing the extension arms fully extended.

In the embodiment of the invention shown in FIGS. 6-9 of the drawings, the adjustable hull section 11 is linked to the underside of the fixed upper central deck area 23 by extension arms 25. The extension arms may be in the form of hydropneumatic rams and are located at both the bow 17 and stern 31 of the craft. The extension arms 25 are pivotally mounted to allow the arms to pivot within a prescribed arc which is controlled by suitable linkages 33. The extension arms are of sufficient size and strength to enable the adjustable hull, when fully lowered, to support the elevated craft (as shown in FIG. 7). In order to assist in the elevation and support of the craft, a pressurized or inflatable plenum chamber may be provided between the upper deck area and the adjustable hull as has already been described above.

In operation in deep water the adjustable hull 11 may be in the raised position so that the craft operates as a multihull craft. If desired air may be passed into chamber 27 so that the adjustable hull section 11 is lowered to the desired position. As the craft moves over the water, any pitching action of the boat is reduced by the adjustable hull and chamber 27 acting as a shock absorber, thereby providing a smoother ride for the occupants of the craft. When approaching shallow water or water containing obstructions, it is desirable to have a craft with a shallow draft. With this particular invention air is passed into chamber 27 until the adjustable hull section 11 has been lowered to the level of the keels of the adjacent port 13 and starboard 15 hulls. This then changes the craft from a multi-hull craft to one which has a relatively flat bottom. The load being carried is supported over a greater area and thereby reduces the amount of draft required. Control of the air in chamber 27 may be provided for example by blowers 28 or the like located on the bridge or deck of the craft and a pressure relief valve 30, or other suitable means. Where chamber 27 is segmented into sub-units 27a, as described above, separate blowers and valves may be provided for each sub-unit (not shown) installed in the same manner as shown in FIGS. 4 and 5. If desired chamber 27 may be fitted with extension arms 25 to assist in the control of the adjustable hull 11.

Figure 8:
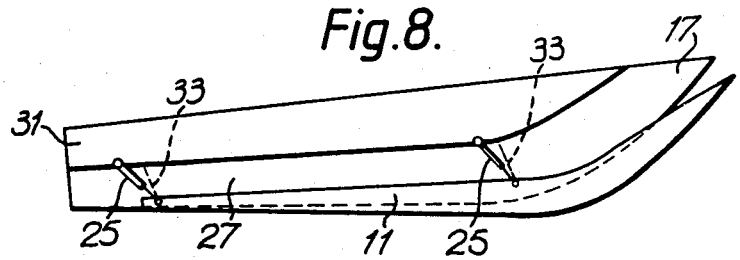
FIG. 8 is a schematic view similar to FIG. 6 showing the arms moving over-centre and moving the craft backwards.
Figure 9:
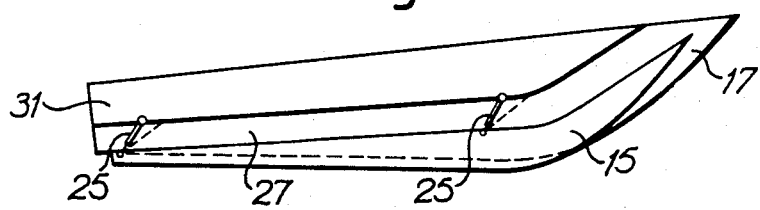
FIG. 9 is a schematic view similar to FIG. 6 showing the arms retracted and commencing a second cycle.

In the operation of a craft fitted with extension arms 25 as shown in FIGS. 6-9 of the drawings it is possible to "walk" the craft into and out of the water. To carry out this function the craft is manouvered into shallow water by lowering the adjustable hull and operating on a shallow draft. When "bleached", the extension arms 25 are extended as shown in FIGS. 6 and 7 of the drawings until the adjustable hull 11 is in contact with the ground and the port and starboard hull sections are elevated. Each extension arm 25 is pivotally mounted to the craft and controlled by a linkage 33. Continual extension of the arms 25 results in the arms being moved overcenter and the craft moved rearwardly as shown in FIG. 8 of the drawings. The adjustable hull section 11, port hull sections 13 and starboard hull section 15 are now all in contact with the ground. The extension arms 25 are retracted and the craft is then ready to repeat the cycle for another "step" rearwardly. By suitable alteration of the control linkage means 33 the craft can be made to "walk" forward.

Preferably the chamber 27 is filled with air to assist in the lowering of the adjustable hull. The air contained between the fixed deck and the adjustable hull greatly assists to support the weight of the craft during the "walking" procedure. It also assists to overcome any problems that may arise due to uneven ground or the failure of the extension arms.

This enables a craft to be able to be launched in areas where a conventional boat launching ramp is not available. It also means that it is possible for a boat to "walk" over a reef or if grounded to clear itself into more suitable waters.

I claim:

1. A boat hull capable of efficient operation as a mono-hull vessel and as a multi-hull vessel, comprising a plurality of main hull portions laterally spaced apart, a deck extending between each adjacent pair of said main hull portions with said main hull portions extending downwardly from said deck, an intermediate hull portion movably mounted between each adjacent pair of main hull portions extending substantially from the bow to the stern of said boat hull and below the respective deck to define a plenum chamber between each adjacent pair of main hull portions and respective deck extending substantially the full length of said deck, means to exclude water from said plenum chamber, means to expand and contract each said plenum chamber and to raise and lower at least the stern section of each intermediate hull portion relative to said respective deck so that when each intermediate hull portion is fully lowered the boat will have the characteristics of a mono-hull vessel capable of being caused to plane on the surface of the water, and when at least one of said intermediate hull portions is raised to predetermined positions between the fully lowered and fully raised positions the vessel will have the characteristics of a multi-hull vessel capable of maintaining the vessel in a planing condition once it has reached the planing condition.

2. A boat hull as claimed in claim 1 wherein said plenum chamber comprises a bag of an elastic material.

3. A boat hull as claimed in claim 1 or claim 2 wherein said means to expand the plenum chamber comprises an air blower adapted to blow air at low pressure into the plenum chamber.

4. A boat hull as claimed in any one of claims 1 or 2 wherein at least one of said intermediate hull portion is connected to said respective deck through a parallel motion linkage means.

5. A boat hull as claimed in claim 4 wherein each arm of said parallel motion linkage means includes means to vary the length of each arm.

6. A boat hull as claimed in claim 5 wherein said means to vary the length of each arm comprises a hydropneumatic ram.

7. A boat hull as claimed in claim 1 wherein a plurality of said plenum chambers are disposed one behind the other along the length of said intermediate hull portion, and a separate expansion and contraction means is provided for each of the plenum chambers so that they may be independently controlled.

8. A boat hull capable of efficient operation as a mono-hull vessel and a multi-hull vessel, comprising a plurality of main hull portions laterally spaced apart, a deck extending between each adjacent pair of said main hull portions with said main hull portions extending downwardly from said deck, an intermediate hull portion movably mounted between each adjacent pair of main hull portions extending substantially from the bow to the stern of said boat hull and below the respective deck, and means to lower and raise at least the stern section of each said intermediate hull portion relative to said respective deck so that when each said intermediate hull portion is fully lowered the boat will have the characteristics of a mono-hull vessel capable of being caused to plane on the surface of the water, and when at least one of said intermediate hull portions is fully raised the vessel will have the characteristics of a multi-hull vessel capable of maintaining the vessel in a planing condition once it has reached the planing condition, said means to raise and lower each intermediate hull portion being compressible so that shock forces applied to each intermediate hull portion during movement of the boat hull over water will be at least partly absorbed by compression of said means.

9. A boat hull capable of efficient operation as a mono-hull vessel and as a multi-hull vessel comprising: a plurality of main hull portions laterally spaced apart, a deck extending between each adjacent pair of said main hull portions with said main hull portions extending downwardly from said deck, an intermediate hull portion movably mounted between each adjacent pair of main hull portions and below the respective deck to define a plenum chamber between each adjacent pair of main hull portions and respective deck extending substantially the full length of said deck, means to exclude water from said plenum chamber, means to expand and contract each said plenum chamber and to raise and lower at least the stern section of each intermediate hull portion relative to said respective deck so that when each intermediate hull portion is fully lowered the boat will have the characteristics of a mono-hull vessel and when at least one of said intermediate hull portions is raised to predetermined positions between the fully lowered and fully raised positions the vessel will have the characteristics of a multi-hull vessel, and a transverse, rearwardly facing step on the bottom of at least one intermediate hull portion.

10. A boat hull as claimed in claim 9 wherein said plenum chamber comprises a bag of an elastic material.

11. A boat hull as claimed in claim 9 wherein a plurality of said plenum chambers are disposed one behind the other along the length of each intermediate hull portion, and a separate expansion and contraction means is provided for each of the plenum chambers so that they may be independently controlled.

12. A boat hull as claimed in claim 9, 10 or 11 wherein a tunnel is provided extending longitudinally of at least one of said intermediate hull portions which tunnel opens at one end adjacent the bow of the intermediate hull portion above the waterline of the hull and opens at the other end into said rearwardly facing step.

* * * * *